United States Patent
Regnier et al.

(10) Patent No.: US 6,484,538 B1
(45) Date of Patent: *Nov. 26, 2002

(54) METHOD OF DETECTING WHEN AN OPTICAL PREFORM MCVD TUBE IS COMPLETELY CLOSED

(75) Inventors: Jean-François Regnier, Vaucresson; Gérard Orcel, Villebon sur Yvette, both of (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/682,088

(22) Filed: Jul. 17, 1996

(30) Foreign Application Priority Data

Jul. 19, 1995 (FR) .............................. 95 08730

(51) Int. Cl.⁷ ................................ C03B 37/07
(52) U.S. Cl. .......................... 65/379; 65/419
(58) Field of Search .................... 65/379, 419, 428

(56) References Cited

U.S. PATENT DOCUMENTS 4,632,684 A    12/1986   Kabrbassiyoon et al.
4,828,592 A  * 5/1989   Matsumura ................ 65/419
5,127,929 A  * 7/1992   Günther .................... 65/379

FOREIGN PATENT DOCUMENTS

| DE | 3527017 A1 | 2/1986 |
| DE | 247206 | * 7/1987 | ................ 65/419 |
| DE | 3830624 A1 | 3/1990 |
| FR | 2621706 A1 | 4/1989 |
| GB | 2176776 A | 1/1987 |

OTHER PUBLICATIONS

Translation of DD 247 206 A1.*

* cited by examiner

Primary Examiner—John Hoffmann
(74) Attorney, Agent, or Firm—Sughrue Mion, PLLC

(57) ABSTRACT

A method of detecting a critical state of closing of a preform during a phase of closing of the preform following a phase of deposition of layers of material that reduce the radial size of an opening formed in the preform smaller in the radial direction comprises the steps of injecting a gas into the opening, measuring a pressure in a pipe element through which the injected gas flows and detecting the critical state of closing of the optical preform on the basis of a measured pressure.

4 Claims, 2 Drawing Sheets

METHOD OF DETECTING WHEN AN OPTICAL PREFORM MCVD TUBE IS COMPLETELY CLOSED

BACKGROUND OF THE INVENTION

1. Field of the Invention

The present invention concerns the fabrication of an optical preform. A preform of this kind is used to manufacture an optical fiber.

To be more precise, the invention concerns a method and system for detecting a critical state of closing of an optical preform during a phase of closing the preform following a phase of depositing layers of material that reduce the radial size of an opening formed in the preform. The preform fabrication technique is typically of the intra-tube type, such as the Modified Chemical Vapor Deposition (MCVD) technique.

2. Description of the Prior Art

Referring to FIG. 1, which is highly schematic, the initial phase of depositing layers of material for the fabrication of an optical preform is carried out in the following manner. Starting with a silica tube 1, layers 2 of material that will form the cladding and the optical core of the optical fiber subsequently extracted from the preform are deposited successively onto the interior wall of the tube 1. The layers 2 of material deposited inside the tube 1 are the result of chemical reactions between gaseous reagents 3 injected into the tube 1. A heating element 4 outside the tube 1 increases the temperature inside the tube 1 to a level sufficient for the required reactions between the gaseous reagents to take place. The following two reactions between silicon tetrachloride and oxygen, on the one hand, and between germanium tetrachloride and oxygen, on the other hand, are typical examples:

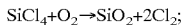

$$SiCl_4 + O_2 \rightarrow SiO_2 + 2Cl_2;$$

and

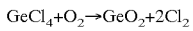

$$GeCl_4 + O_2 \rightarrow GeO_2 + 2Cl_2$$

Layer by layer deposition in this manner offers the facility for very precise shaping of the refractive index profile of the optical fiber that will be obtained from the preform, by appropriate metering of the reagents 3 injected into the tube 1. The depositing of these layers of material therefore reduces the radial size of an opening formed in the preform as a consequence of the increased thickness of the layers 2.

When all of the material needed to form the preform has been deposited in layers onto the inner wall of the tube 1 the deposition phase is stopped and is followed by a phase of closing the preform. For this closing phase, the objective of which is to close the preform completely, the temperature of the preform is increased and the feed of gaseous reagents is stopped. It is necessary to inject a gas under pressure into the opening formed in the preform, however, typically an oxygen-based gas. This gas must be injected under pressure only until a critical time corresponding to a critical state of closing of the preform. This critical state must be detected with great accuracy to prevent all risks of retrograde diffusion due to interrupting injection of the gas before the critical time and all risk of bursting of the preform if the injection of gas is continued after the critical time.

In the prior art, the only way to detect this critical state of closing of the preform is by human intervention. It is based on visual monitoring of the changing diameter of the opening formed in the preform. The fact that human intervention alone is relied on limits the reliability of the assessment of the critical time.

The invention is therefore directed to remedying this drawback by providing a method and system for detecting a critical state of closing of an optical preform.

SUMMARY OF THE INVENTION

The invention consists in a method of detecting a critical state of closing of a preform during a phase of closing of said preform following a phase of deposition of layers of material that reduce the radial size of an opening formed in said preform, said method comprising the steps of:

injecting a gas into said opening, measuring a pressure in a pipe element through which the injected gas flows, and detecting said critical state of closing of said optical preform on the basis of a measured pressure.

A valve for evacuating said injected gas is opened in response to said detection of said critical state of closing of said optical preform in order to reduce the pressure in the opening.

In a first embodiment the detection is effective when a difference between said measured pressure and a measured initial pressure is greater than a predetermined threshold.

In a second embodiment the detection is effective when said measured pressure is greater than a predetermined threshold.

The invention also consists in a system for implementing the method comprising:

pipe means connected to one end of said preform, means for injecting said gas into said opening via said pipe means, and sensor means for measuring a pressure in said pipe means.

The system advantageously further comprises suction pump means connected to the other end of said preform.

Other features and advantages of the present invention will emerge more clearly from a reading of the following description with reference to the corresponding appended drawings.

DETAILED DESCRIPTION OF THE PREFERRED EMBODIMENT

Figure 2:
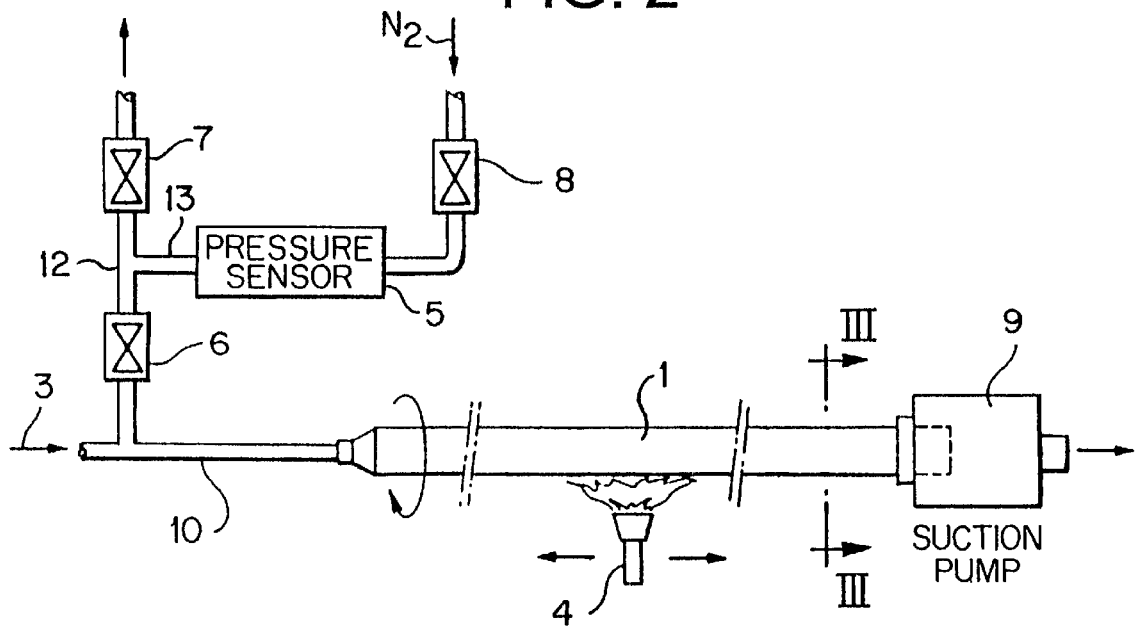
FIG. 2 shows a system in accordance with the invention for fabricating an optical preform and including a system for detecting a critical state of closing of the preform.
Figure 3:
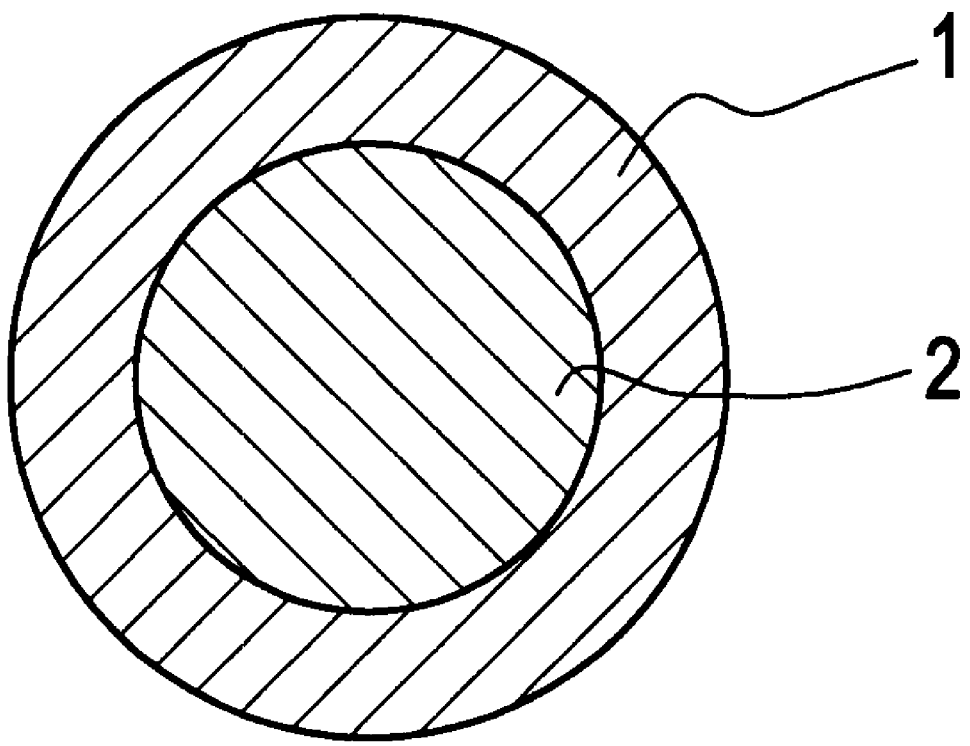
FIG. 3 schematically shows a cross section, as taken along lines III—III of FIG. 2, of a completely closed state of an optical preform.

Referring to FIG. 2, in one embodiment of the invention an optical preform fabrication system comprises a tube 1, typically a silica tube, onto the inside of which layers of material are deposited, a heater element 4 adapted to heat the tube 1, a main pipe 10 connected to a source (not shown) of injected gas 3, a first branch pipe 12 connected in parallel to the main pipe 10, a second branch pipe 13 connected in parallel to the first branch pipe 12, a pressure sensor 5, three valves 6, 7 and 8 and a suction pump 9.

The main pipe 10 ends at one end of the tube 1 and establishes a sealed connection between the injection gas source (not shown) and the interior of the tube 1. The suction pump 9 at the other end of the tube discharges the gas 3 injected by the injection gas source. In series in the first branch pipe 12 branching from the main pipe 10 are the valve 6 which is called the branch valve and the valve 7 which is called the evacuation valve. The second branch pipe 13 connected to a nitrogen $N_2$ feed source is connected between the two valves 6 and 7. The second branch pipe 13 includes the pressure sensor 5 in series with the valve 8 which is called the purge valve.

Figure 1:
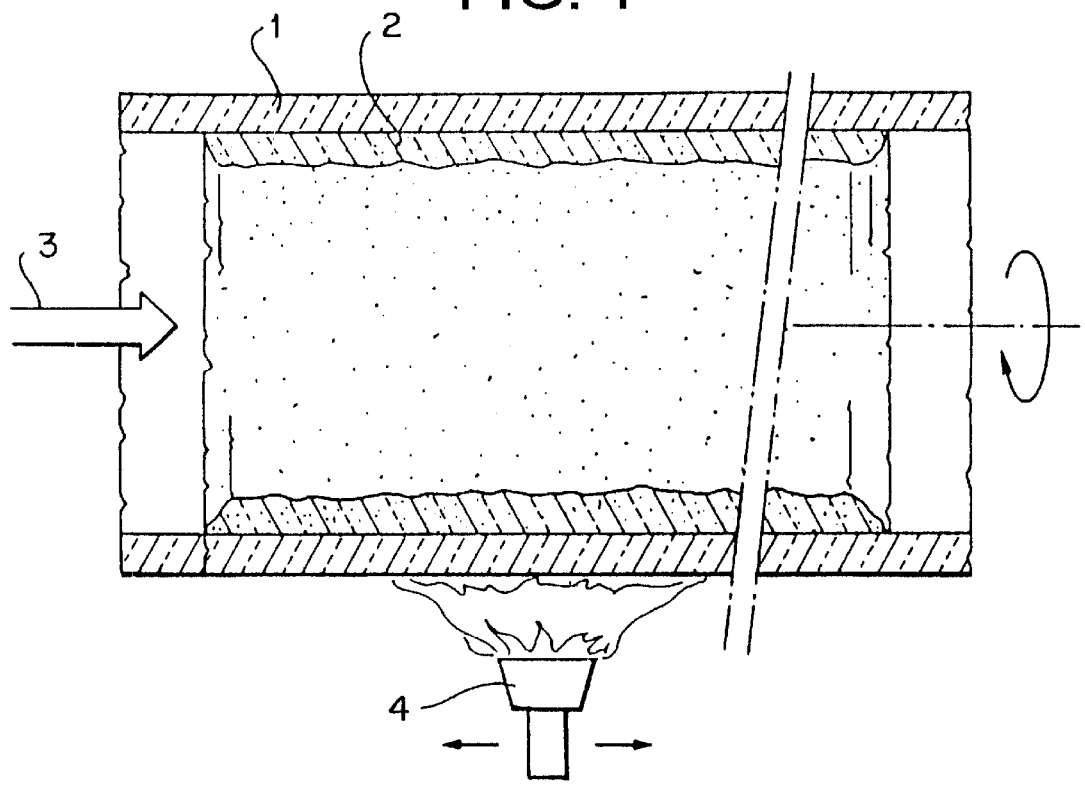
FIG. 1, already commented on, is a diagram showing an optical preform during fabrication and the components needed for its fabrication.

The optical preform fabrication system shown in FIG. 2 is used in the following manner. The preform closing phase, to which the invention relates, starts either at the end of the phase of depositing layers of material in which gaseous reagents 3 are injected into the tube to form what will become the core of the optical fiber (see FIG. 1), or at the end of an etching phase following the deposition phase and during which aggressive gases are injected into the opening formed in the preform. During the deposition or etching phase the branch valve 6 is closed. In accordance with the invention, at the end of the deposition or etching phase, coinciding with the start of the closing phase, the valve 6 is opened so that the status of the system is then as follows:

the evacuation valve 7 is closed, the purge valve 8 is closed, and the branch valve 6 is open.

A gas 3, for example an oxygen-based gas, is injected by the source via the main pipe 10 and through the opening formed in the preform 1. The pressure sensor 5 measures the pressure in the main pipe 10 through which the injected gas flows. This pressure is representative of the degree of closure of the preform. The detection of the critical state of closing of the optical preform, at which the evacuation valve 7 must be opened, is therefore based on the measured pressure. There are two feasible ways to implement this detection. In a first variant, detection is effective as soon as the pressure measured by the sensor 5 is greater than a predetermined first threshold. In another variant designed to compensate for any zero drift of the sensor 5, detection is effective as soon as a difference between the measured pressure and a measured initial pressure is greater than a predetermined second threshold. In practise the initial pressure is the pressure measured by the sensor 5 at the start of the closing phase, shortly after the valve 6 after the closing of the valve 6.

The circuit via the second branch pipe 13 and the portion of the first branch circuit 12 downstream of the point of connection of the second branch pipe and including the evacuation valve 7 is for cleaning the pressure sensor 5 using nitrogen. The cleaning is carried out by closing the valve 6, opening both valves 7 and 8 and opening the nitrogen $N_2$ feed source.

The person skilled in the art will understand that the scope of the invention is not limited to the embodiment described and that, in particular, the measurement of a pressure by means of a sensor can be effected in any type element through which the gas 3 injected during the closing phase flows. Furthermore, it will be obvious that the method of the invention can be partly or totally automated. For example, the opening of the valve 7 for evacuating the gas 3 in response to detection of the critical state of closing of the optical preform can be automatic. Moreover, although the foregoing description is limited to a single embodiment relating to an optical preform, the invention applies to any other implementation for closing a tube, referred to as a "preform", adapted to form a given structure, whether the latter is an optical waveguide or not. Finally, the invention can be implemented differently, for example using the prior art apparatus to apply an internal radial counter-pressure to the layers of material deposited during the deposition phase. The invention would use such apparatus, located alongside the suction pump 9, during the closing phase to inject a gas into the preform in order to detect closing of the latter by measuring a pressure due to this injection of gas.

What is claimed is:

1. A method of detecting when a preform is completely closed, comprising steps of:
    after completion of a deposition phase for forming the preform, injecting a gas through a pipe and into an opening in the preform in a closing phase;
    measuring a pressure of the gas in the pipe during the closing phase; and
    detecting that the optical preform is completely closed when the pressure measured in said measuring step is greater than a predetermined threshold.

2. The method according to claim 1, further comprising steps of opening a valve and evacuating the injected gas through the valve when the complete closing of the optical preform is detected in said detecting step.

3. The method according to claim 1, further comprising steps of opening a valve and evacuating the injected gas through the valve when the critical state of closing of the optical preform is detected in said detecting step.

4. A method of detecting a critical state of closing of a preform, comprising steps of:
    after completion of a deposition phase for forming the preform, injecting a gas through a pipe and into an opening in the preform in a closing phase;
    measuring a pressure of the gas in the pipe during the closing phase; and
    detecting the critical state of closing of the optical preform when the pressure measured in said measuring step is greater than a predetermined threshold.

* * * * *